United States Patent
Hamamoto (12)

(10) Patent No.: US 6,450,468 B1
(45) Date of Patent: Sep. 17, 2002

(54) SLIDING DRAWER DEVICE FOR VEHICLE

(75) Inventor: Yoshiaki Hamamoto, Hiroshima (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/547,040

(22) Filed: Apr. 11, 2000

(30) Foreign Application Priority Data

Apr. 28, 1999 (JP) .......................................... 11-120856

(51) Int. Cl.$^7$ ................................................ A47K 1/08
(52) U.S. Cl. .................... 248/311.2; 224/281; 224/926; 248/240.1; 248/316.4; 297/188.17
(58) Field of Search .......................... 248/311.2, 298.1, 248/309.1, 316.4, 240.1, 424, 429, 27.1, 27.3; 297/188.17, 188.16, 188.15; 224/281, 282, 926

(56) References Cited

U.S. PATENT DOCUMENTS

| | | | |
|---|---|---|---|
| 3,606,112 A | | 9/1971 | Cheshier |
| 4,040,659 A | * | 8/1977 | Arnold .................. 297/188.17 |
| 4,892,281 A | | 1/1990 | DiFilippo et al. |
| 5,087,008 A | * | 2/1992 | Miller et al. ............. 248/311.2 |
| 5,379,978 A | * | 1/1995 | Patel et al. .............. 248/311.2 |
| 5,560,572 A | * | 10/1996 | Osborn et al. ............. 248/27.3 |
| 5,692,718 A | * | 12/1997 | Bieck ...................... 248/311.2 |
| 5,791,617 A | * | 8/1998 | Boman et al. ........... 248/311.2 |
| 5,988,579 A | * | 11/1999 | Moner, Jr. et al. ....... 248/311.2 |
| 6,250,527 B1 | * | 6/2001 | Mizue et al. ............. 224/281 |
| 6,253,975 B1 | * | 7/2001 | Ichioka et al. ............. 224/281 |

FOREIGN PATENT DOCUMENTS

| | | |
|---|---|---|
| JP | 5-32360 | 8/1993 |
| JP | 6-87369 | 3/1994 |
| JP | 7-291007 | 11/1995 |
| JP | 2000-313282 | * 11/2000 |

* cited by examiner

*Primary Examiner*—Leslie A. Braun
*Assistant Examiner*—Tan Le
(74) *Attorney, Agent, or Firm*—Kanesaka & Takeuchi

(57) ABSTRACT

A sliding drawer device is formed of a first component, and a second component slid ably held inside the first component. The first component includes left and right side walls to be spaced apart and face each other, left and right guide grooves formed in inner sides of the left and right side walls, and left and right slide grooves formed in the side walls to communicate with the respective left and right guide grooves. The left and right slide grooves extend in the back and forth directions. The second component includes left and right outer side portions placed between the left and right side walls to face the same, and a pair of left and right protrusions projecting outward from the respective outer side portions. The left and right protrusions can be inserted into the respective left and right slide grooves through the guide grooves to be slidable along the slide grooves. The distance between the end surfaces of the left and right protrusions is greater than the distance between the two inner surfaces of the left and right guide grooves. The protrusions can be easily assembled with the slide grooves without disengagement.

9 Claims, 13 Drawing Sheets

SLIDING DRAWER DEVICE FOR VEHICLE

BACKGROUND OF THE INVENTION AND RELATED ART STATEMENT

The present invention relates to a sliding drawer device for a vehicle, such as a cup holder, a tray, a small article compartment, and so on, and particularly, protrusions of the sliding drawer device can be easily inserted into slide grooves by pressing, and furthermore can be prevented from being slipped out of the slide grooves unexpectedly.

In the traditional sliding drawer device for a vehicle, slide grooves and pins have been installed between a housing frame and a slider, and the pins are pressed into the slide grooves. However, in the above-mentioned traditional structure, there has been a problem that press-fitting becomes difficult when the biting of the pins against the slide grooves is too strong. On the other hand, the pins slip out of the slide grooves when the biting of the pins against slide grooves is too weak.

The present invention has been made in view of the above problems, and an object of the invention is to provide a sliding drawer device, wherein protrusions of the drawer device can be easily introduced into slide grooves.

Another object of the invention is to provide a sliding drawer device as stated above, wherein the protrusions are prevented from being slipped out of the slide grooves in a condition that a second component is pulled out toward a person.

A further object of the invention is to provide a two-step openable sliding drawer device for a vehicle having the above structure.

A still further object of the invention is to provide a sliding drawer device as stated above, wherein rattling of the components is prevented in a condition that the second component is held inside a third component.

A still further object of the invention is to provide a sliding drawer device as stated above, wherein in a condition that the second component is pulled out toward a person, the protrusions are prevented from being slipped out of the slide grooves due to external impacts.

Further objects and advantages of the invention will be apparent from the following description of the invention.

SUMMARY OF THE INVENTION

A sliding drawer device for a vehicle, i.e. cup holder, in the first aspect of the invention is equipped with a first component or slider, and a second component or holder main body. The sliding drawer device for a vehicle includes not only a cup holder, but a tray, or a small article compartment. The first component is affixed to a vehicle in an embedded fashion. In particular, the slider as the first component is affixed to a car in an embedded fashion through a case. The slider itself may be embedded directly into a car body. The second component or holder body is held in the first component or slider to be slidable in the back and forth directions, and is used in the pulled-out position from the car body toward a person.

The first component or slider is equipped with a pair of left and right side walls, and a pair of left and right slide grooves. The pair of left and right side walls is spaced apart and faces each other. The pair of left and right slide grooves is made on the pair of left and right side walls, respectively, and extends along the sliding direction of the second component.

The second component or holder body is equipped with a pair of left and right outer sides and a pair of left and right protrusions. The pair of left and right outer sides is placed inside the space between the pair of left and right side walls to face each of the inner surfaces of the side walls. The pair of left and right protrusions projects outward from the left and right outer sides, respectively, and is inserted into the respective left and right slide grooves by pressing to slid along the slide grooves.

Each of the left and right side walls is furnished with a guide groove. The guide groove is made by cutting on the inner side of each side wall, and the facing pair of guide grooves guide each of the left and right protrusions into each of the slide grooves.

Each of the left and right guide grooves is located on the back side of the respective left and right slide grooves. The distance between the two facing inner surfaces of the left and right guide grooves is shorter than the distance between the two end surfaces of the left and right protrusions.

The invention in the second aspect has the following features in addition to the aforementioned features in the first aspect.

A sliding drawer device for a vehicle is equipped with a third component or case. The third component or case holds the first component or slider to be able to slide back and forth, and houses both the first component or slider and the second component or holder body.

The second component or holder body has several leg parts. These leg parts contact the bottom wall of the third component or case when the second component is stored inside the third component or case.

The invention described in the third aspect has the following features in addition to the aforementioned features of the invention in the first aspect.

A sliding drawer device for a vehicle, i.e. tray, is equipped with a first component or housing unit, and a second component or tray body. Here, the tray is illustrated as the sliding drawer device for a vehicle, but a cup holder and a small article compartment could also be applicable as a sliding drawer device. The first component or housing unit is affixed to a car or vehicle in an embedded fashion. The second component or tray body is held in the first component or housing unit to be slidable back and forth, and is used in the pull-out position from the car body toward a person.

The first component or housing unit is equipped with a pair of left and right inner sides, i.e. inner sides of left and right side walls, and a pair of left and right protrusions. The pair of left and right inner sides of the left and right side walls is spaced apart on the left and right, and faces each other. The pair of left and right protrusions faces each other and projects inward from the left and right inner sides.

The second component or tray body is equipped with a pair of left and right outer sides, i.e. outer sides of left and right side walls, and slide grooves. The pair of left and right outer sides is placed inside the space between the pair of left and right inner sides, i.e. inner side of the left and right side walls, of the first component or housing unit. The slide grooves are made by cutting inwards on the left and right outer sides, i.e. outer sides of the left and right side walls, to extend along the sliding direction of the second component or tray body, and receive the left and right protrusions inserted by pressing. Here, totally two slide grooves are actually made on the left and right side walls, but one slide groove and one opening on the left and right outer sides of the second component or tray body will also work properly.

The second component or tray body is equipped with guide grooves on the left and right outer sides, i.e. outer sides of left and right side walls. The guide grooves are made by cutting inwards on the left and right outer sides, i.e. outer sides of the left and right side walls in order to guide each of the left and right protrusions into each of the slide grooves.

Each of the left and right guide grooves is located in the front part of the slide grooves. The distance between the two opposing inner surfaces of the left and right guide grooves is longer than the distance between the end surfaces of the left and right protrusions.

Detailed Description of Preferred Embodiments

FIG. 1 through FIG. 10 show a first embodiment of the present invention. FIG. 11 through FIG. 15 show a second embodiment of the present invention.

Figure 1:
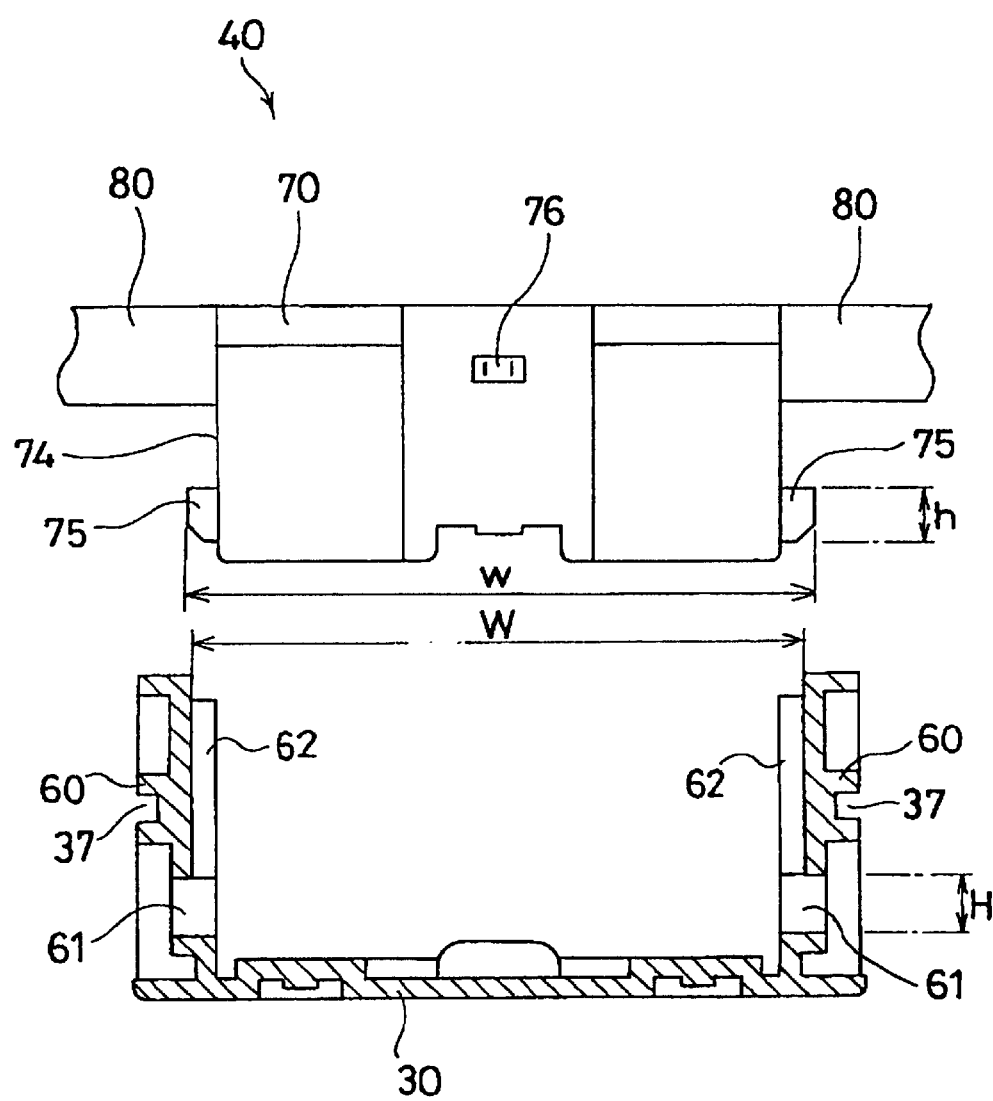
FIG. 1 is a partial sectional view of a disassembled condition of a slider and a holder body.
Figure 2:
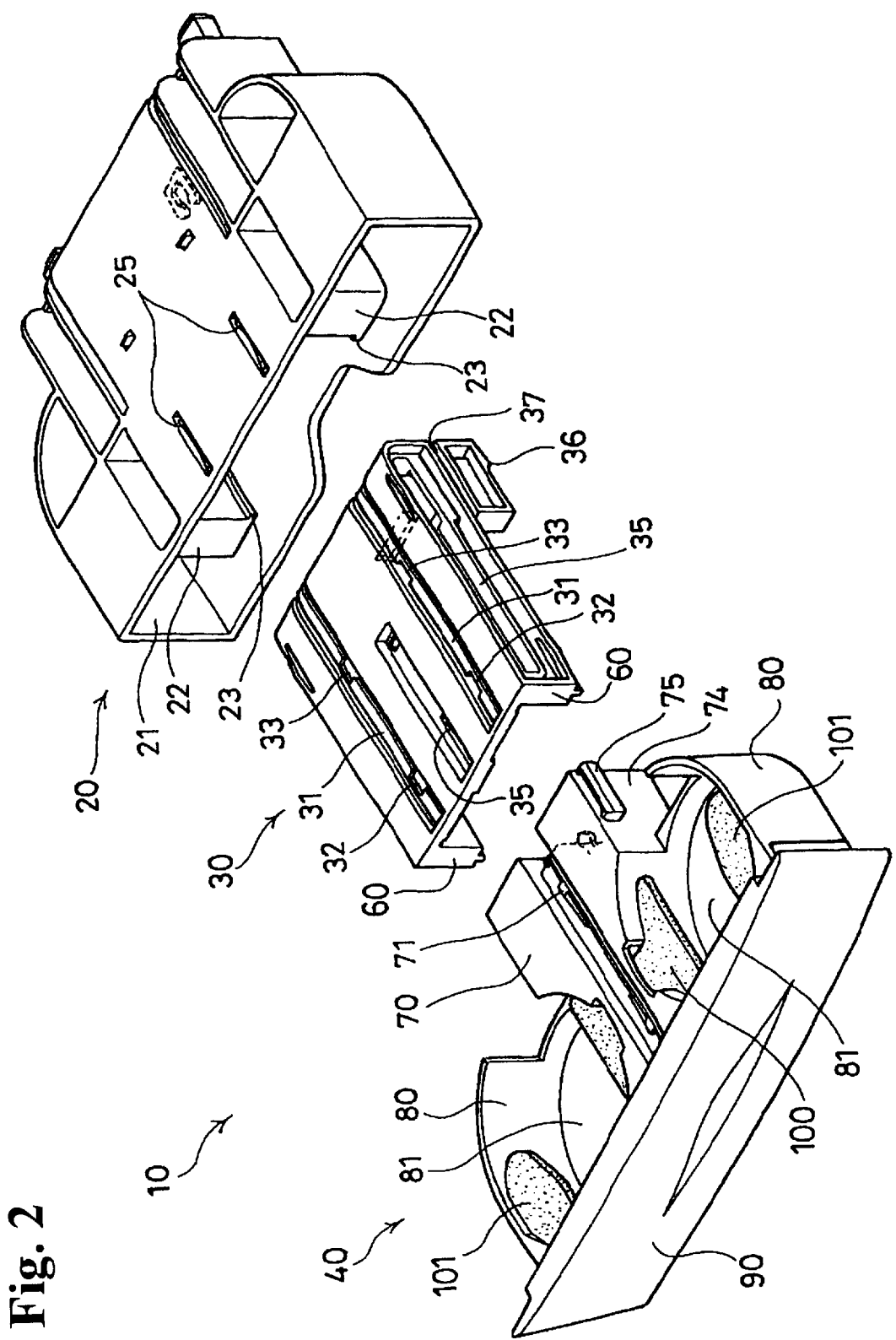
FIG. 2 is an exploded perspective view of a cup holder.
Figure 3:
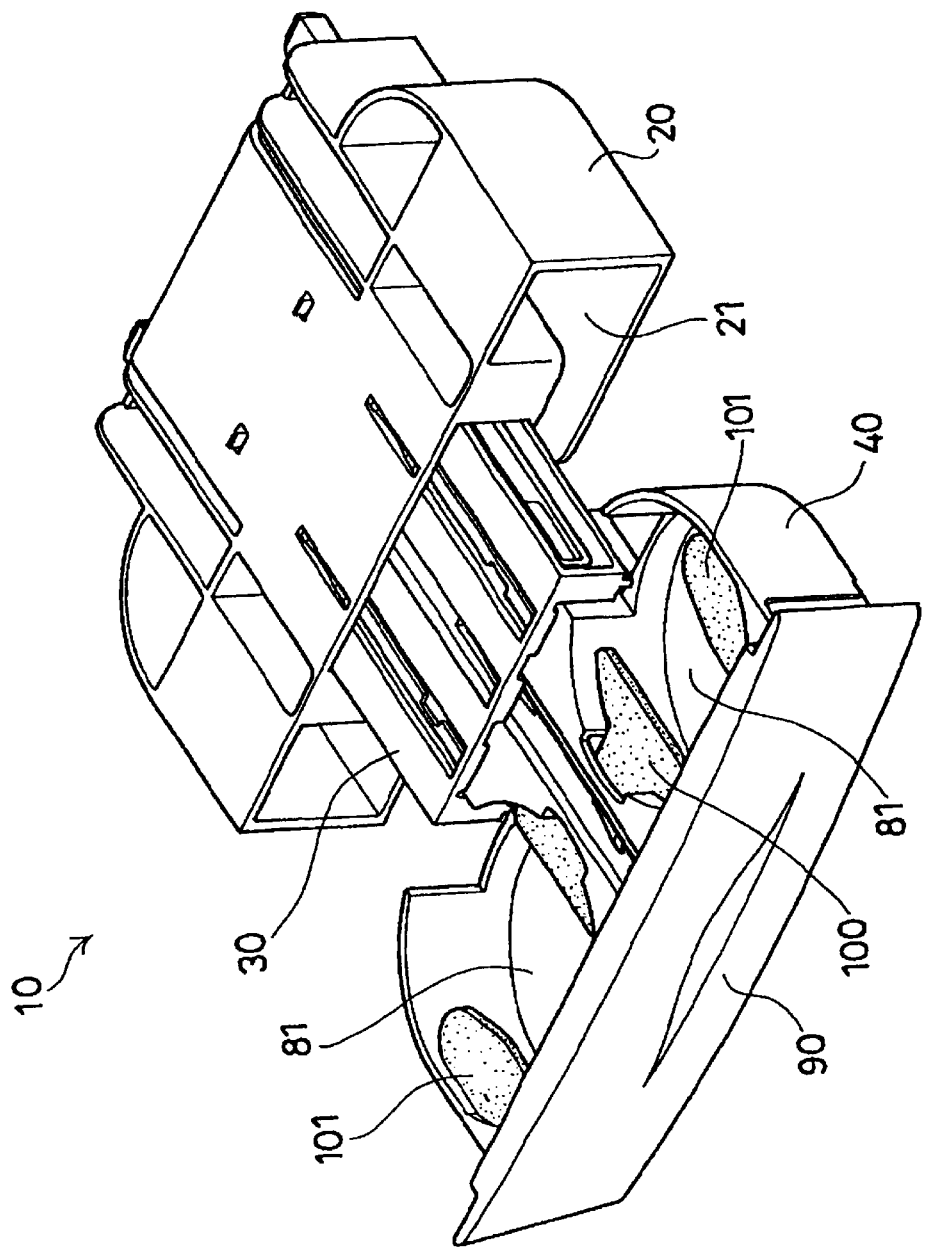
FIG. 3 is a perspective view of an assembled cup holder.
Figure 4:
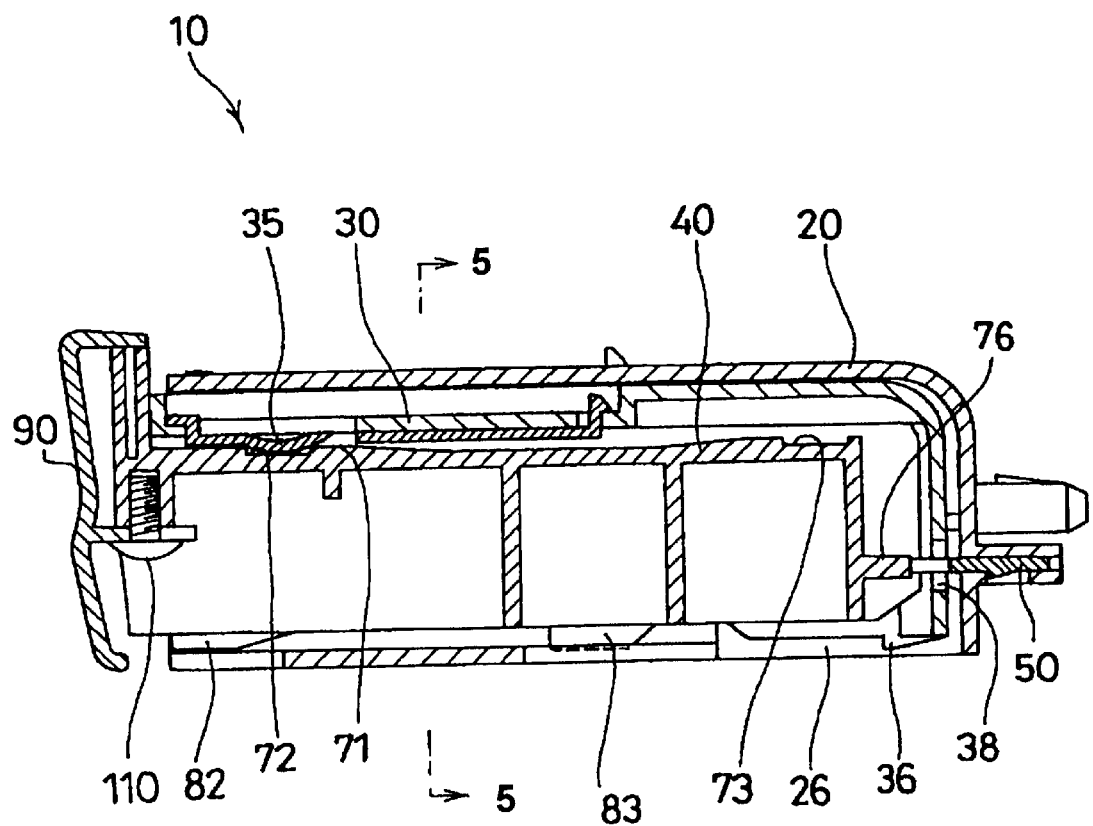
FIG. 4 is a sectional view of the cup holder in a closed position.
Figure 5:
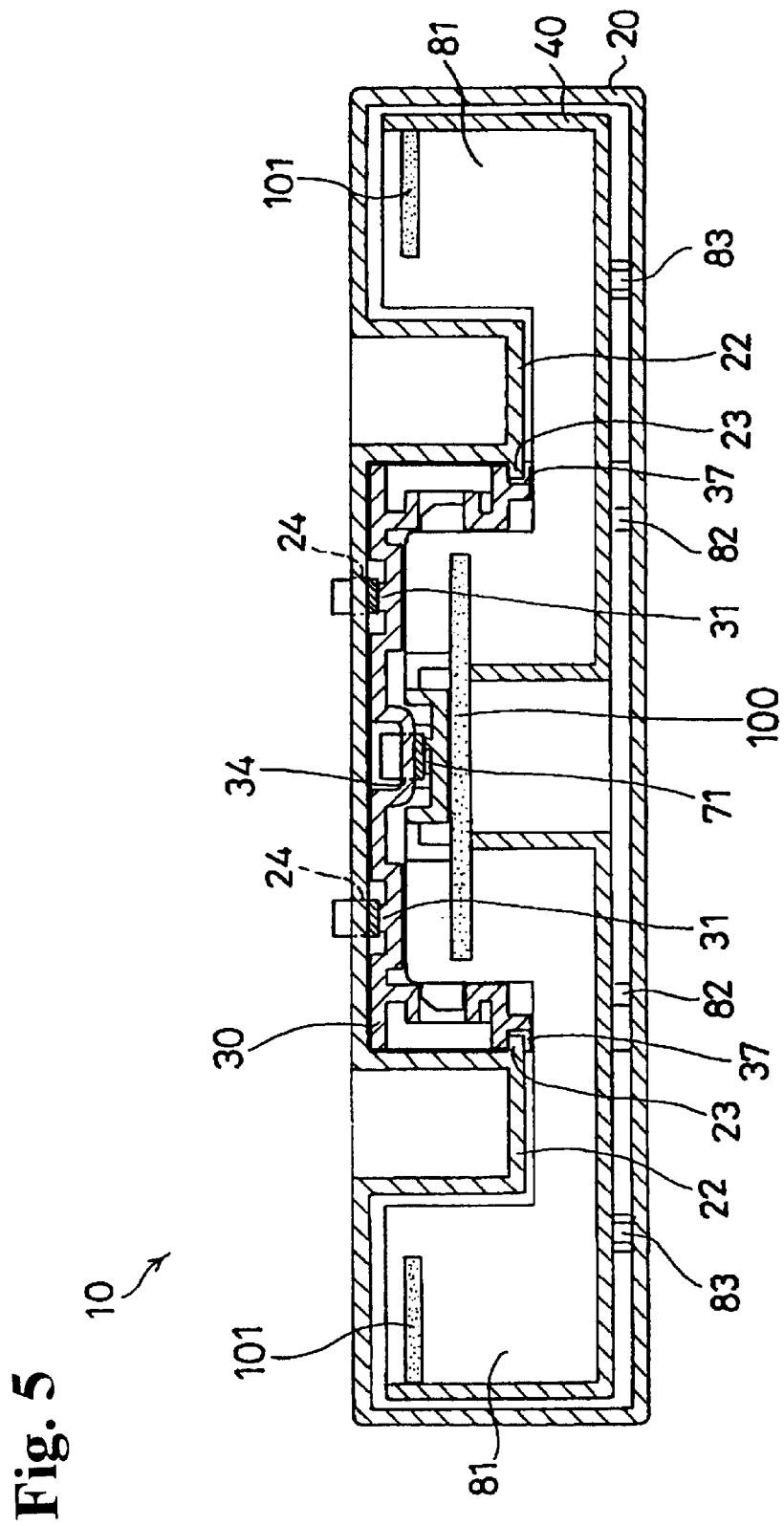
FIG. 5 is a sectional view taken along line 5—5 of FIG. 4.
Figure 6:
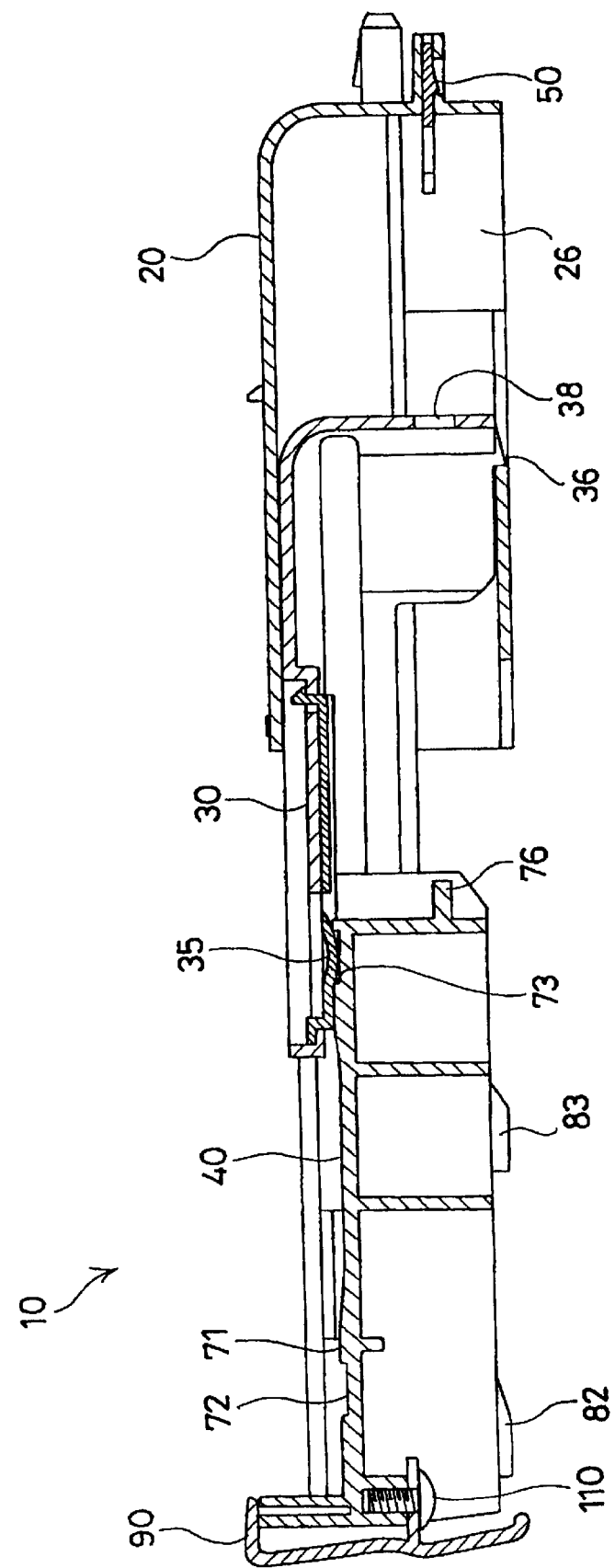
FIG. 6 is a sectional view of the cup holder in a pull-out position corresponding to FIG. 4.
Figure 7:
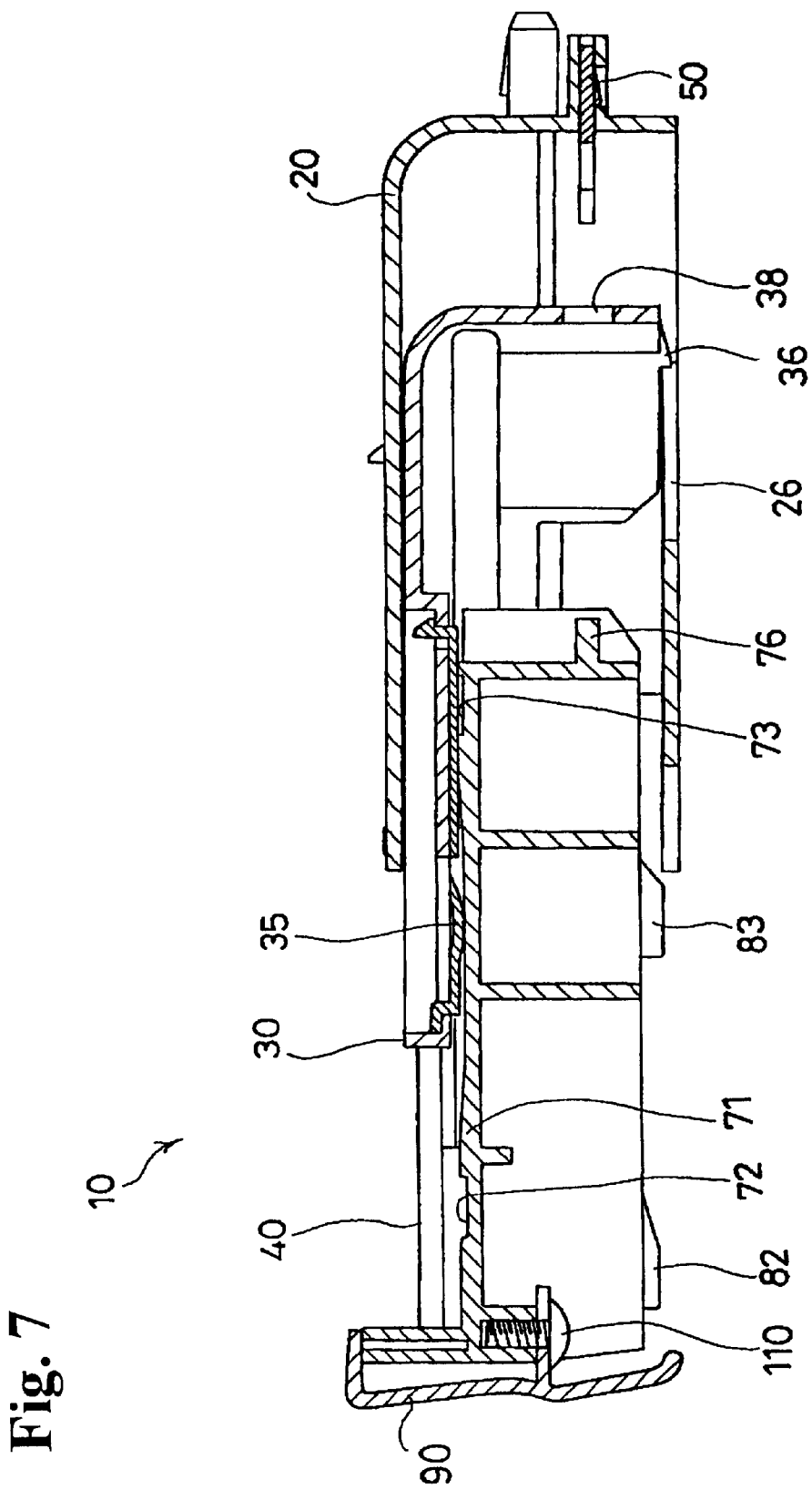
FIG. 7 is a sectional view of the cup holder in a half-pull-out position corresponding to FIG. 4.
Figure 8:
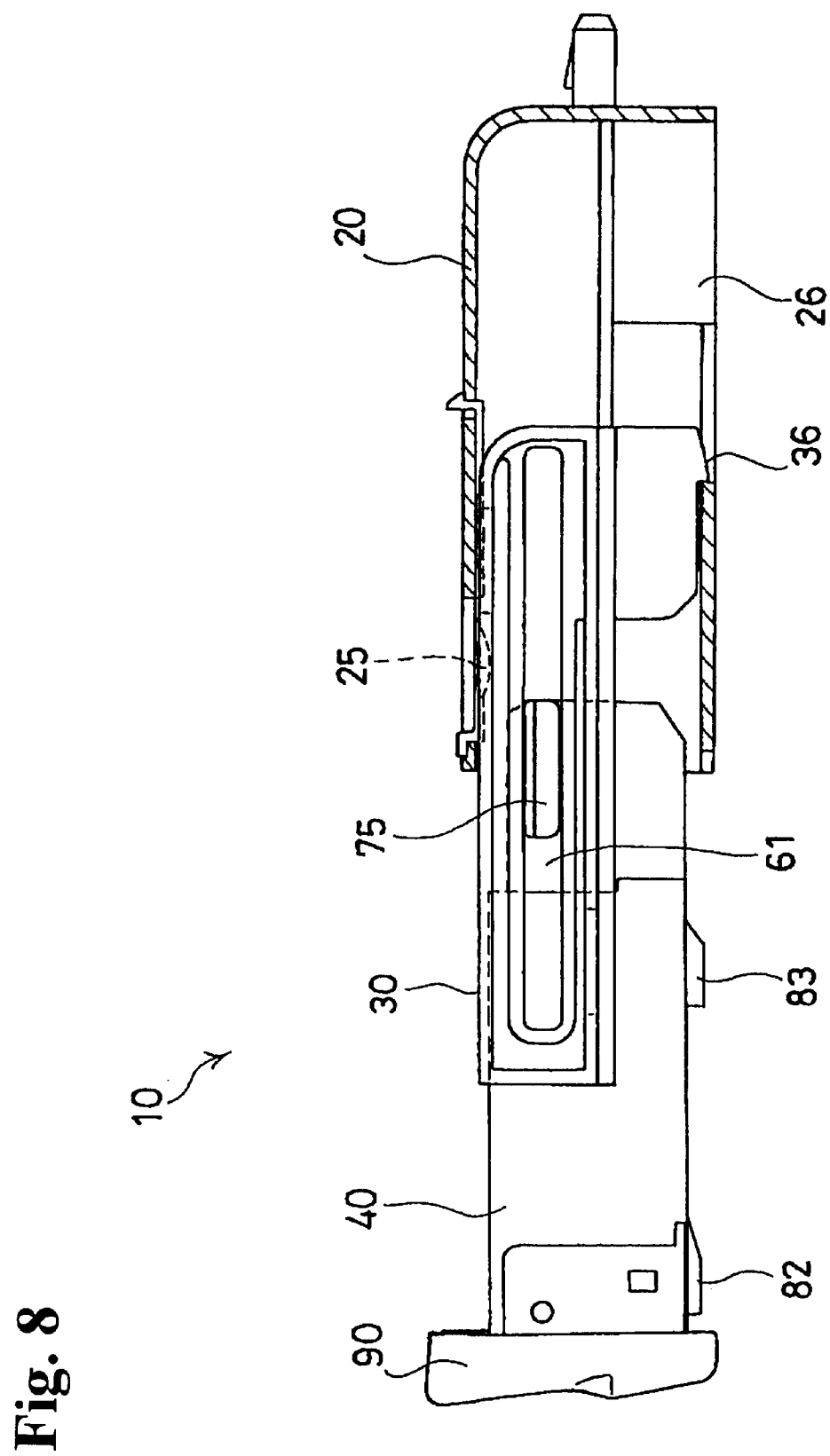
FIG. 8 is another sectional view corresponding to FIG. 7.
Figure 9:
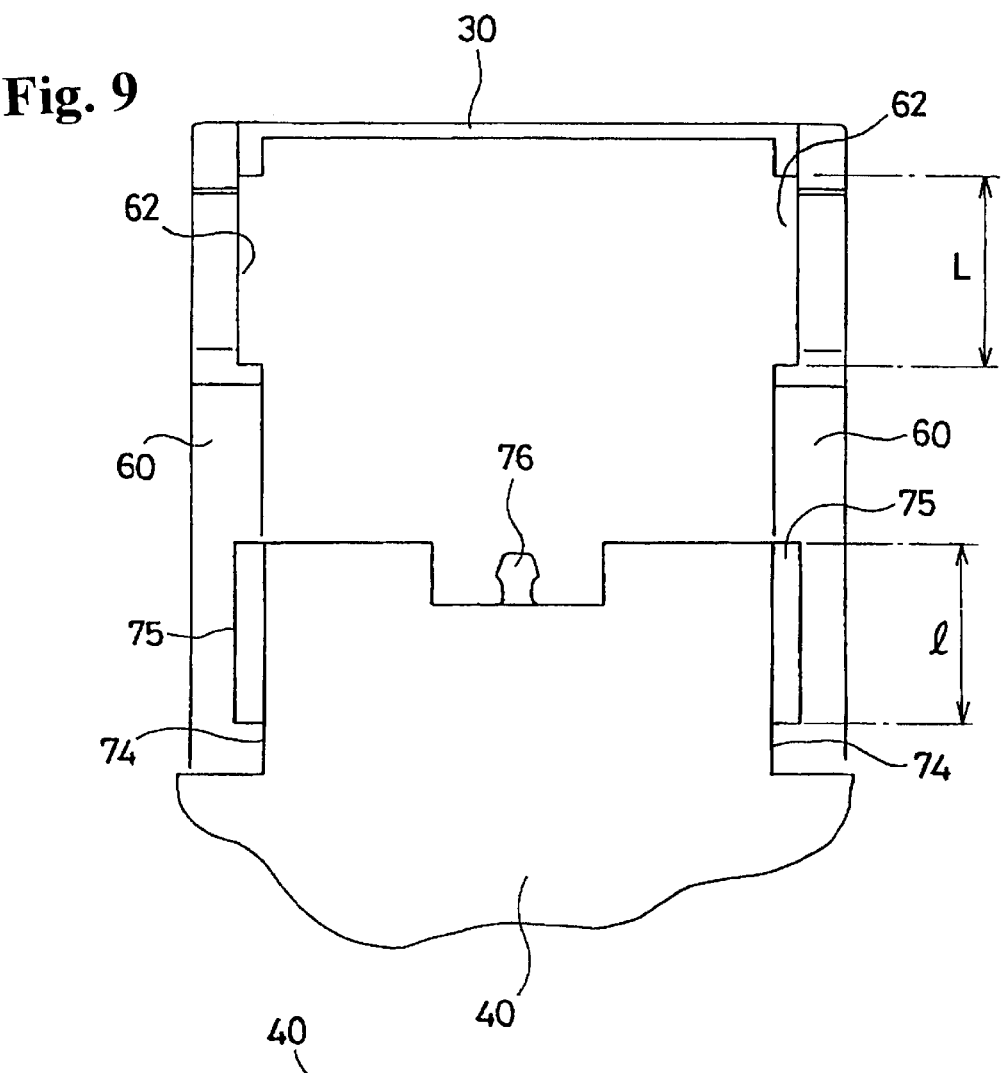
FIG. 9 is a partial top plan view of the slider and holder body.
Figure 10:
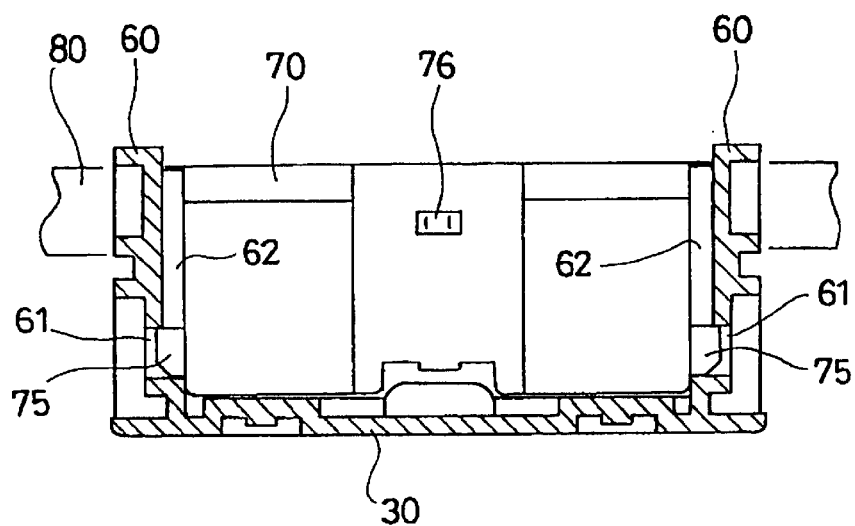
FIG. 10 is a partial sectional view of the assembled slider and holder body corresponding to FIG. 1.

FIG. 1 is a partial sectional view of a slider and a holder body in a disassembled condition; FIG. 2 is a perspective view of a cup holder in a disassembled condition; FIG. 3 is a perspective view of an assembled cup holder; FIG. 4 is a sectional view of the cup holder in a closed position; FIG. 5 is a sectional view taken along line 5—5 of FIG. 4; FIG. 6 is a sectional view of the cup holder in a pull-out position corresponding to FIG. 4; FIG. 7 is a sectional view of the cup holder in a half-pull-out position corresponding to FIG. 4; FIG. 8 is another sectional view corresponding to FIG. 7; FIG. 9 is a partial top plan view of the slider and the holder body; and FIG. 10 is a partial sectional view of the slider and holder body in the assembled condition corresponding to FIG. 1.

Figure 11:
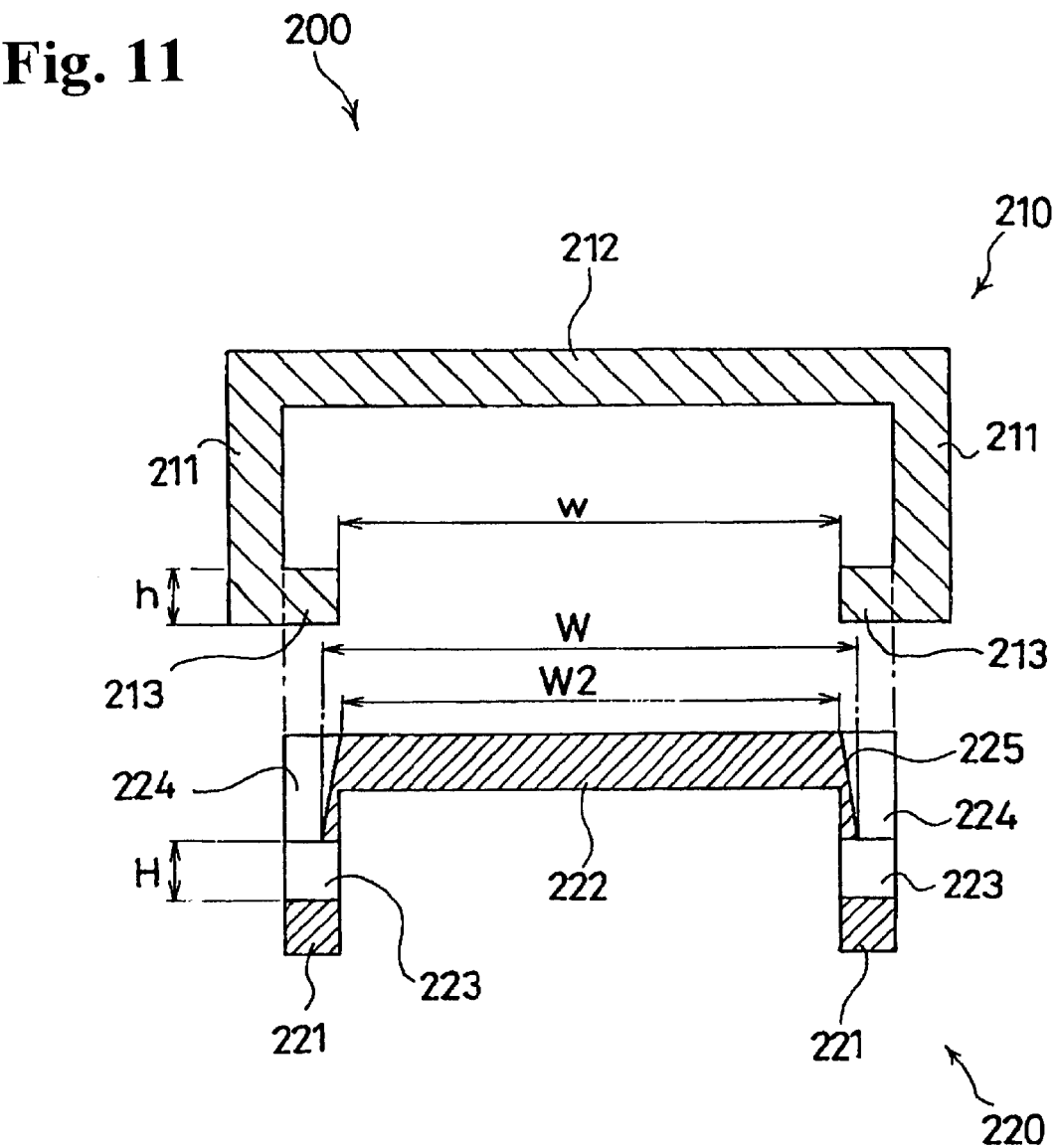
FIG. 11 is a sectional view of a tray in a disassembled condition showing another embodiment of the invention.
Figure 12:
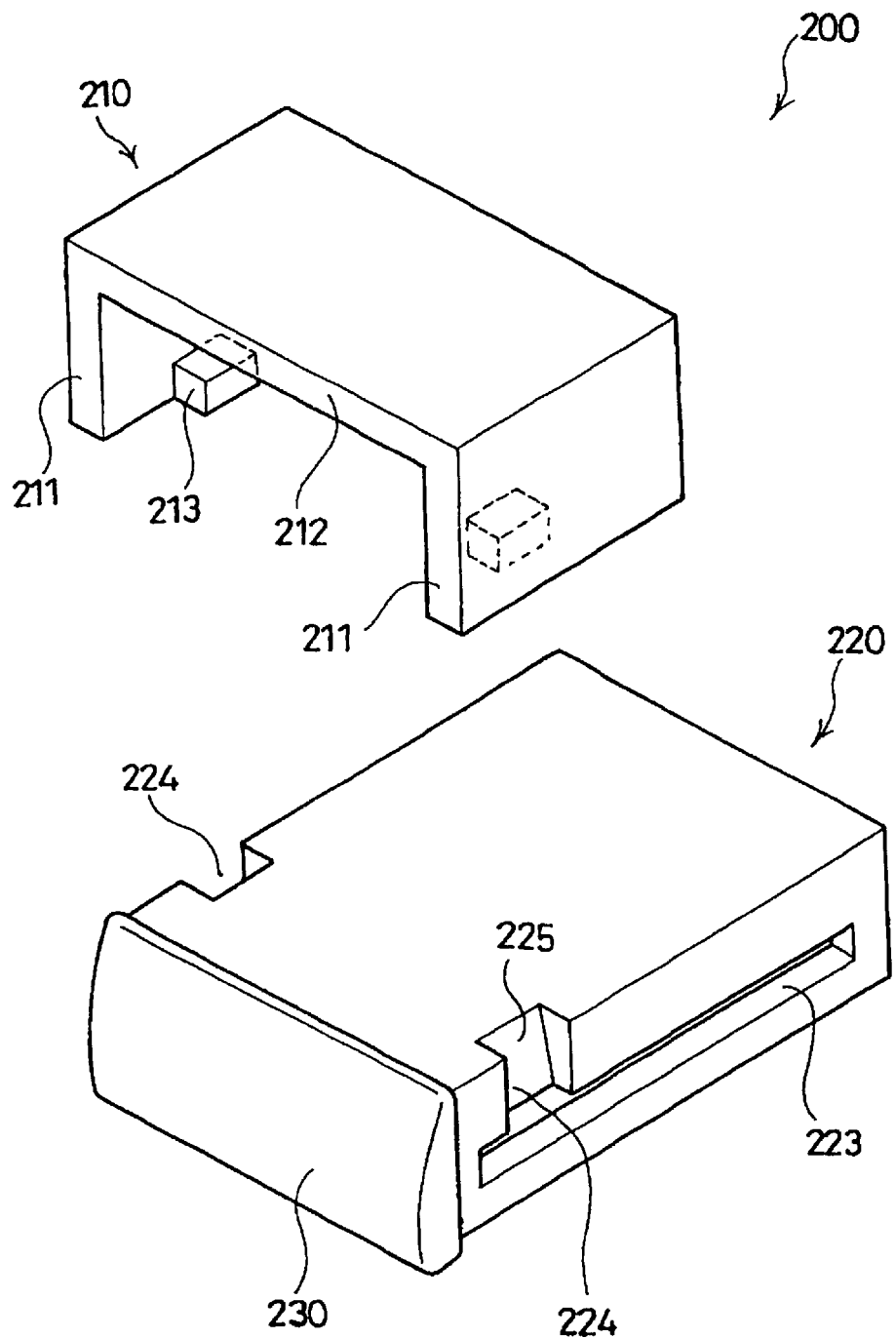
FIG. 12 is a perspective view of the disassembled tray.
Figure 13:
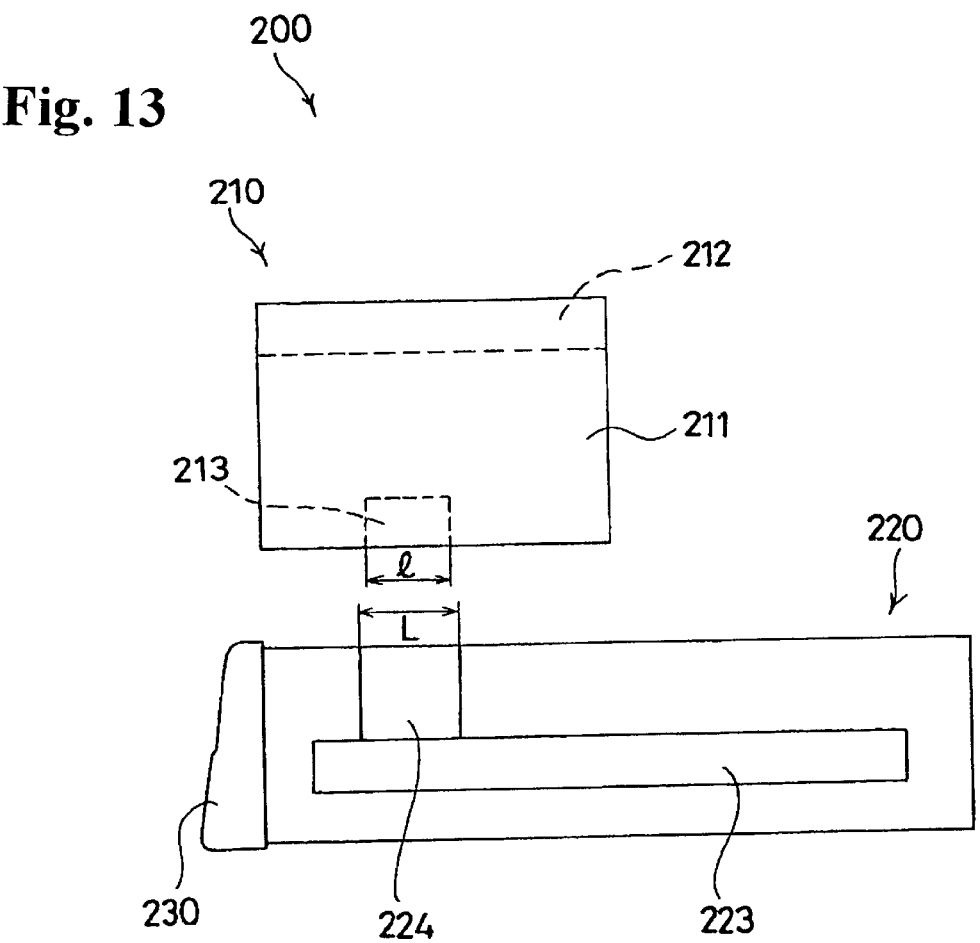
FIG. 13 is a side view of the disassembled tray.
Figure 14:
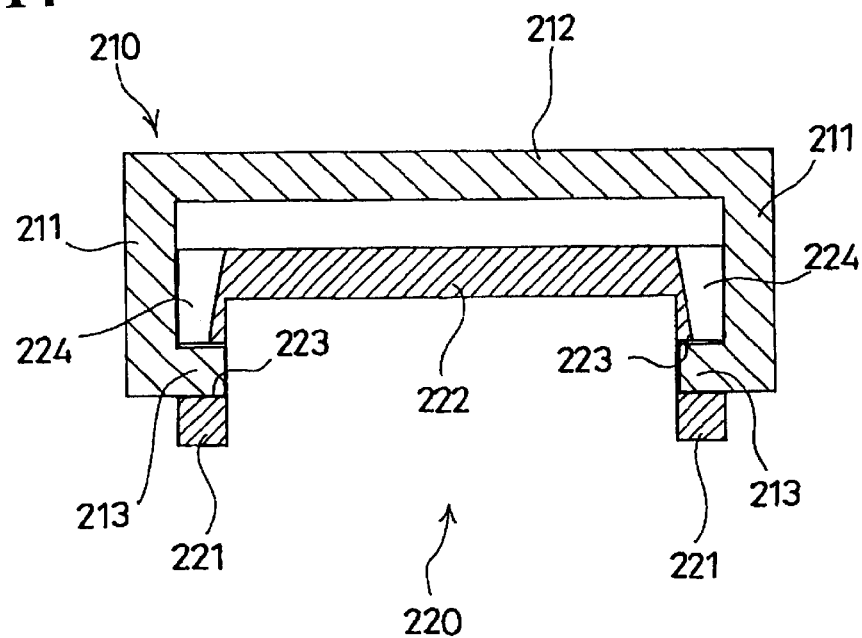
FIG. 14 is a sectional view of an assembled tray corresponding to FIG. 11.
Figure 15:
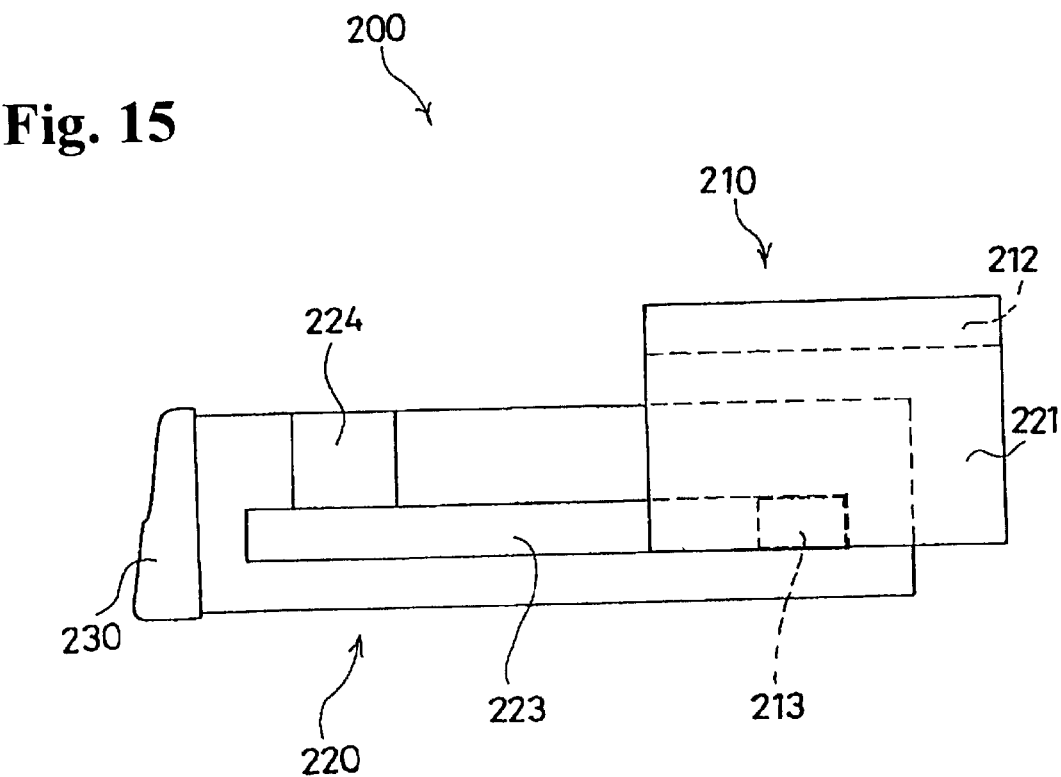
FIG. 15 is a side view of the assembled tray corresponding to FIG. 13.

FIG. 11 is a sectional view of a tray in a disassembled condition; FIG. 12 is a perspective view of the disassembled tray; FIG. 13 is a side view of the disassembled tray; FIG. 14 is a sectional view of the assembled tray corresponding to FIG. 11; and FIG. 15 is a side view of the assembled tray corresponding to FIG. 13.

Numeral 10 in FIG. 2 and FIG. 3 illustrates a sliding-type cup holder. The cup holder 10 is installed in the interior of a car, not illustrated. Here, the cup holder 10 is illustrated as the sliding drawer device for the car, but it may be applied to a tray or a small article compartment. The cup holder 10 is mainly formed of a case 20, a slider 30 and a holder body 40, as shown in FIG. 2.

The case 20 is of a hollow box type with an open front 21 as shown in FIG. 2, and is affixed to a car interior in an embedded fashion which is not illustrated here. The case 20 has proper elasticity and stiffness, and is formed integrally by a thermoplastic resin, such as ABS resin.

The top wall of the case 20 is equipped with guide walls 22 and rail grooves 24 as shown in FIG. 2 and FIG. 5.

The guide walls 22 as shown in FIG. 5 protrude downward from the top wall of the case 20 separately on the left and right. The left and right guide walls 22 have guide ribs 23, which protrude inward from the ends of the guide walls to face each other, and extend along the sliding direction of the slider 30 at the lower parts.

A pair of left and right rail grooves 24 as shown in FIG. 5 is located between the left and right guide walls 22, and extends along the sliding direction of the slider 30. Each rail groove 24 has a convex shape with an open bottom as shown in FIG. 5.

Each of the left and right rail grooves 24 has a downward-protruding elastic piece 25 on its front end as shown in FIG. 8. The rail grooves 24 and the elastic pieces 25 are formed integrally to have proper elasticity and stiffness by a thermoplastic resin, such as POM, and are attached to the case 20 later.

The bottom wall of the case 20 as shown in FIG. 6 has square windows 26 passing through vertically. The back wall of the case 20 as shown in FIG. 6 has a latch 50 on its center.

The slider 30 has a box shape with an open bottom, and a width to be fitted between the left and right guide walls 22 of the case 20 as shown in FIG. 5. The slider 30 with proper elasticity and stiffness is formed integrally by a thermoplastic resin, such as ABS resin.

The top wall of the slider 30 as shown in FIG. 2 and FIG. 5 has a pair of left and right rails 31, which fit in the rail grooves 24 at the case 20. Each rail 31 protrudes with a convex sectional shape. The left and right rails 31 slide along the left and right rail grooves 24 to prevent rattling of the slider 30.

Each of the left and right rails 31 has two concave dents 32, 33 on the front and back areas of the rail for receiving the elastic piece 25 of the case 20 therein as shown in FIG. 2. The position where the front dent 32 engages the elastic piece 25 corresponds to the closed position of the slider 30. When the slider 30 is pushed in the case, a click is produced at its closed position. The position where the back dent 33 engages the elastic piece 25 corresponds to the maximum pull-out position of the slider 30 as shown in FIG. 8, where a click is produced when the slider 30 is pulled out from the case.

The slider 30 also has a rail groove 34 extending along the sliding direction of the holder body 40 on the lower surface of the top wall as shown in FIG. 5. The rail groove 34 has a concave sectional shape with an open bottom as shown in FIG. 5. The rail groove 34 also has a downward-protruding elastic piece 35 on its front area as shown in FIG. 6. The rail groove 34 and the elastic piece 35 are formed to have proper elasticity and stiffness by a thermoplastic resin, such as POM, and are attached to the groove 34 in the slider 30.

Each of the left and right side walls 60 of the slider 30 as shown in FIG. 1 and FIG. 8 has an elliptical slide groove 61 extending along the sliding direction of the holder body 40 with a lateral opening. Each of the left and right side walls 60 as shown in FIG. 1 and FIG. 9 has a guide groove 62 with a concave sectional shape cut out at the inner side of the side wall. The left and right guide grooves 62 are located on the back side of the slide grooves 61 as shown in FIG. 9. Each of the left and right guide grooves 62 has an open top and a bottom communicating with the slide groove 61 as shown in FIG. 1.

Furthermore, the left and right side walls 60 have a pair of left and right pawls 36 protruding downward from the bottom surfaces of the back ends as shown in FIG. 6. The left and right pawls 36 determine the forward end position of the slider 30 by catching the front edges of the windows 26 of the case 20. Guide grooves 37 with a C-like concave sectional shape are formed between the pawl 36 and the side wall 60, respectively, as shown in FIG. 1 and FIG. 5.

The slider 30 has a square see-through hole 38 in the center of its back wall, through which the latch 50 can pass as shown in FIG. 6.

The holder body 40 as shown in FIG. 2 and FIG. 6 has a main body 70, a cup holding unit 80, and a lid 90.

The main body 70 is rectangular and of a box type as shown in FIG. 2, and has its width almost equal to the distance between the left and right side walls 60 of the slider 30. The main body 70 has a rail 71 which fits in the rail groove 34 of the slider 30 in the center of its top surface as shown in FIG. 2 and FIG. 5. The rail 71 protrudes with a convex sectional shape. The rail 71 slides along the rail groove 34 to thereby prevent rattling of the main body 70.

There are two concave dents 72, 73, in which the elastic piece 35 of the slider 30 fits, on the front and back of the rail 71 as shown in FIG. 2 and FIG. 6. The position of the elastic piece 35 fitting in the front of the dent 72 corresponds to the closed position of the holder body 40 as shown in FIG. 4. When the holder body 40 is pushed into the case, a click is produced at its closed position. The position of the elastic piece 35 fitting in the back dent 73 corresponds to the maximum pull-out position of the holder body 40 as shown in FIG. 6, where a click is produced when the holder body 40 is pulled out.

The main body 70 has a pair of left and right protrusions 75 projecting outward from the left and right outer sides 74 as shown in FIG. 1 and FIG. 9. The height h of each protrusion 75 is equal to or smaller than the height H of the slide groove 61 of the slider 30 as shown in FIG. 1. Here, the height h is set to be almost equal to the height H. The length 1 of each protrusion is equal to or shorter than the length L of the guide groove 62 of the slider 30 as shown in FIG. 9. Here, the length 1 is set to be almost equal to the length L.

The distance w between both end surfaces of the left and right protrusions 75 is longer than the distance W between the inner facing surfaces of the left and right guide grooves 62 of the slider 30 as shown in FIG. 1.

When the left and right protrusions 75 are placed and pressed into the left and right guide grooves 62 of the slider 30, the left and right side walls 60 of the slider 30 are slightly deformed outwardly, and the distance W between the facing left and right guide grooves 62 is expanded. Then, the left and right protrusions can fit in the left and right guide grooves 62, respectively. When the left and right protrusions are further pressed into the slider 30, the left and right protrusions 75 fit in the left and right slide grooves 61, respectively, as shown in FIG. 10. Once the left and right protrusions 75 fit in the left and right slide grooves 61, the left and right side walls 60 of the slider 30 recover their original dimensions due to the elastic restoring force of the resin. Therefore, the left and right protrusions 75 can not be pulled out from the left and right slide grooves 61.

Also, the left and right protrusions 75 hang in or overlap with the left and right slide grooves 61, and the difference between the distance w from the left to right protrusions 75 and the distance W from the left to right guide grooves 62 becomes the hanging margin as shown in FIG. 10.

The main body 70 has a strike 76 for holding the latch 50 on its back side as shown in FIG. 4 and FIG. 9. The strike 76 passing through the hole 38 of the slider 30 as shown in FIG. 4 is connected to the latch 50 by being held at both left and right sides, and this is the closed position of the holder body 40 and the slider 30. If the holder body 40 is pulled out strongly, the strike is disconnected from the latch 50, and the holder body 40 and the slider 30 can be moved as shown in FIG. 7.

The cup holding units 80 are located at both the left and right sides of the main body 70 as shown in FIG. 2. The cup holding unit 80 and the main body 70 are formed integrally by a thermoplastic resin, such as ABS, with proper stiffness.

The cup holding units 80 as shown in FIG. 2 and FIG. 3 have the two cup holes 81 for inserting cans, plastic bottles, and paper or plastic cups. Each of the left and right cup holes 81 has stoppers 100, 101 as shown in FIG. 2 and FIG. 5. Each of the stoppers 100, 101 is made of a very elastic material, for example, urethane foam. The stoppers 100, 101 prevent a cup in the cup holding unit 80 from rattling. The cup holding units 80 have several, for example, totally four leg parts 82, 83 on its bottom surface as shown in FIG. 4 and FIG. 5. The leg parts 82, 83 contact the bottom wall of the case 20 when the holder body 40 is in the closed position and prevent the holder body 40 from rattling in the case 20.

The lid 90 is larger than the opening 21 of the case 20 as shown in FIG. 2 and FIG. 4, and has proper stiffness. The lid 90 is formed integrally of a thermoplastic resin, such as PP. The lid 90 is affixed to the front surface of the holder body 40 by a screw 110 as shown in FIG. 4. The lid 90 covers the opening 21 of the case 20 when the holder body 40 is in the closed position, as shown in FIG. 4.

FIG. 11 through FIG. 15 illustrate the sliding drawer-type tray 200 as a second embodiment of the sliding drawer device for a car. The tray 200 is installed in a car interior, not illustrated. Here, the tray 200 is illustrated as the sliding drawer device for the car, but the sliding drawer device may be applied to the cup holder 10 shown in FIG. 1 through FIG. 10 or a small article compartment, not illustrated here.

The tray 200 is mainly formed of a housing unit 200, a tray body 220 and a lid 230, as shown in FIG. 11 through FIG. 15.

The housing unit 210 has a C-like sectional shape with an open bottom as shown in FIG. 11 and FIG. 12, and is embedded into a car interior, not illustrated. The housing unit 210 has proper elasticity and stiffness, and is formed integrally of, for example, a thermoplastic resin. The housing unit 210 is equipped with a pair of lift and right side walls 211, and a top wall 212, as shown in FIG. 11 and FIG. 12.

A pair of the left and right side walls 211 is separated on the left and right, and face each other as shown in FIG. 11 and FIG. 12. The left and right side walls 211 have left and right protrusions 213, which project and face each other to create an L-like sectional shape on the bottom end of the side walls as shown in FIG. 11 and FIG. 12. The top wall 212 is connected to the top ends of the left and right side walls 211.

The tray body 220 has a C-like sectional shape with an open bottom, and its width fitting between the left and right side walls 211 of the housing unit 210 as shown in FIG. 11 and FIG. 12. The tray body 220 has a proper stiffness, and is formed integrally of, for example, a thermoplastic resin. The tray body 220 is equipped with a pair of left and right side walls 221, and a top wall 222, as shown in FIG. 11 and FIG. 12.

A pair of the left and right side walls 221 is separated on the left and right, and face each other as shown in FIG. 11 and FIG. 12. Each of the left and right side walls 221 has a slide groove 223 around the middle height area of the side wall, into which the respective left and right protrusions 213 of the housing unit 210 fits as shown in FIG. 11 and FIG. 12. The left and right slide grooves 223 pass through the respective left and right side walls 221 laterally, and extend along the sliding direction of the tray body 220 as shown in FIG. 11 through FIG. 13.

The height H of the left and right slide grooves 223 is equal to or greater than the height h of the left and right protrusions 213, and here, the height H is set to be almost equal to the height has shown in FIG. 11. Each of the left and right slide grooves 223 is connected to each of the guide grooves 224 which are made by cutting a C-like sectional shape into the side wall from the outer side of the left and right side walls 221 as shown in FIG. 11 and FIG. 12. The left and right guide grooves 224 are located at the front area of the slide grooves 223 as shown in FIG. 12 and FIG. 13. Each of the left and right guide grooves 224 has an open top side, and a bottom side communicating with the slide groove 223 as shown in FIG. 11 and FIG. 12.

Each of the left and right guide grooves 224 has a tapered surface 225 which makes the groove depth gradually decrease from the top end of the guide groove toward the slide groove 223 as shown in FIG. 11 and FIG. 12. The distance W between the shallowest points of the guide groove on the left and right tapered surfaces 225 is longer than the distance w between the end surfaces of the left and right protrusions 213 of the housing unit 210 as shown in FIG. 11. Furthermore, the distance W2 between the deepest points of the guide groove on the left and right tapered surfaces 225 is equal to or longer than the distance w between the end surfaces of the left and right protrusions 213 of the housing unit 210, and here, the distance W2 is set to be almost equal to the distance w as shown in FIG. 11.

The width L of the left and right guide grooves 224 is equal to or wider than the width 1 of the left and right protrusions 213 of the housing unit 210, and here the width L is set to be almost equal to the width 1 as shown in FIG. 13. Therefore, when the left and right protrusions 213 of the housing unit 210 are inserted into the respective left and right guide grooves 224 of the tray body 220, the left and right side walls 211 of the housing unit 210 are opened outward because the left and right protrusions 213 are pressed outward by the respective left and right tapered surfaces 225. Once the left and right protrusions 213 of the housing unit 210 pass over the shallowest points at the lower parts of the guide grooves on the left and right tapered surfaces 225, the left and right side walls 211 of the housing unit 210 recover their original dimensions due to the elasticity of the resin, and simultaneously the protrusions 213 fit in the slide grooves 223 without coming off.

The lid 230 is attached to the front of the tray body 220 integrally or as a separate piece, and is used as a handle for pulling out the tray body 220.

The present invention is constructed in the aforementioned way and offers the effects mentioned below.

In the first aspect, since the guide grooves are formed, the protrusions can be easily pressed into the slide grooves.

Also, since the guide grooves are formed on the back side of the slide grooves, the protrusions can be prevented from being slipped out of the slide grooves when the second component stays in the pull-out position. Further, since the slide groove hanging margin is formed in the area of the guide groove, the whole length of the slide grooves can be used.

In the second aspect of the invention, in addition to the effects in the first aspect, a two-step openable sliding drawer device for a vehicle can be provided. Also, since the leg parts of the second component contact the bottom wall of the third component when the second component is enclosed within the third component, rattling of the components in their closed position is prevented.

In the third aspect of the invention, since the guide grooves are provided as in the first aspect, the protrusions can be easily pressed into slide grooves. Since the guide grooves are formed on the front side of slide grooves, contrary to the back side in the first aspect, the protrusions are prevented from being slipped out of the slide grooves due to external impacts, etc. when the second component is in the pull-out position. Also, since the slide groove hanging margins are formed in the areas of the guide grooves, the whole lengths of the slide grooves are used similarly to the first aspect.

While the invention has been explained with reference to the specific embodiments of the invention, the explanation is illustrative and the invention is limited only by the appended claims.

What is claimed is:

1. A sliding drawer device comprising:
 a first component having a pair of left and right side walls to be spaced apart and face each other, a pair of left and right guide grooves formed in inner sides of the left and right side walls to face each other, and a pair of left and right slide grooves formed in each of the side walls to communicate with the respective left and right guide grooves, said left and right slide grooves extending in back and forth directions and said left and right guide grooves extending substantially perpendicularly to the left and right slide grooves, and
 a second component slid ably held inside the first component and having a pair of left and right outer side portions placed between the left and right side walls to face the same, and a pair of left and right protrusions projecting outward from the respective outer side portions, said left and right protrusions being inserted into the respective left and right slide grooves through the guide grooves to be slidable in and along the slide grooves, a distance between end surfaces of the left and right protrusions being greater than a distance between two inner surfaces of the left and right guide grooves so that the protrusions entering into the slide grooves through the guide grooves are slid ably held in the slide grooves without substantially entering back into the guide grooves.

2. A sliding drawer device according to claim 1, wherein said left and right guide grooves are located on back sides of the respective left and right slide grooves.

3. A sliding drawer device according to claim 1, further comprising a third component for holding the first component slid ably in the back and forth directions to thereby house the first and second components therein, said second component having a plurality of legs contacting a bottom wall of the third component when the second component is stored inside the third component.

4. A sliding drawer device according to claim 3, wherein said first component includes one of an engaging groove and an engaging projection, and said third component includes the other of the engaging groove and the engaging projection, said engaging projection slid ably engaging the engaging groove to guide the first component.

5. A sliding drawer device according to claim 1, wherein said second component includes a space for holding a material therein at a front part thereof, said left and right protrusions being formed at a rear part of the second component so that the front part can be pulled out from the first component.

6. A sliding drawer device according to claim 5, wherein said first component includes one of an engaging groove and an engaging projection, and said second component includes the other of the engaging groove and the engaging projection, said engaging projection slid ably engaging the engaging groove to guide the second component.

7. A sliding drawer device according to claim 1, wherein said left and right guide grooves have open ends at sides away from the slide grooves to allow the left and right protrusions to be easily inserted into the guide grooves.

8. A sliding drawing device according to claim 7, wherein said left and right slide grooves penetrate the left and right side walls, respectively.

9. A sliding drawer device comprising:

a first component having a pair of left and right side walls to be spaced apart and face each other, a pair of left and right guide grooves formed in inner sides of the left and right side walls to face each other, and a pair of left and right slide grooves formed in each of the side walls to communicate with the respective left and right guide grooves, said left and right slide grooves extending in back and forth directions, a second component slid ably held inside the first component and having a pair of left and right outer side portions placed between the left and right side walls to face the same, a plurality of legs, and a pair of left and right protrusions projecting outward from the respective outer side portions, said left and right protrusions being inserted into the respective left and right slide grooves through the guide grooves to be slidable along the slide grooves, a distance between end surfaces of the left and right protrusions being greater than a distance between two inner surfaces of the left and right guide grooves, and a third component for holding the first component slid ably in the back and forth directions to thereby house the first and second components therein, said plurality of legs of the second component contacting a bottom wall of the third component when the second component is stored inside the third component.

* * * * *